United States Patent [19]

Hollander

[11] 4,037,302
[45] July 26, 1977

[54] USED VEHICLE PARTS DISASSEMBLY SYSTEM AND METHOD

[76] Inventor: John M. Hollander, 205 County Road No. 6, Wayzata, Minn. 55391

[21] Appl. No.: 660,684

[22] Filed: Feb. 23, 1976

[51] Int. Cl.² .............................................. B23Q 17/00
[52] U.S. Cl. ........................................ 29/403; 29/427; 29/564.1
[58] Field of Search ..................... 29/426, 427, 200 D, 29/200 A, 200 R, 403; 214/1 M, 1 A

[56] References Cited

U.S. PATENT DOCUMENTS

| 1,876,759 | 9/1932 | Romine | 29/200 A |
|---|---|---|---|
| 3,651,754 | 3/1972 | Forest | 29/200 D X |
| 3,685,128 | 8/1972 | Sharp et al. | 29/403 |
| 3,885,292 | 5/1975 | Sharp et al. | 29/403 |

OTHER PUBLICATIONS

Kimel, ". . . The Greatest National Resource . . . ", Dismantler's Digest, Jan.–Feb. 1976, pp. 8,9.

*Primary Examiner*—James R. Duzan
*Attorney, Agent, or Firm*—Dorsey, Windhorst, Hannaford, Whitney & Halladay

[57] ABSTRACT

A system for the disassembly, warehousing and inventory of used vehicle parts obtained from used vehicles has conveyor means on which a used vehicle is transported during disassembly, means for removed used parts from the used vehicle while it is being transported on the conveyor, and a storage area for storing the used parts removing during disassembly. The system further has means for identifying the used vehicle parts stored in the storage area and means for maintaining inventory records of the used vehicle parts which are stored in the storage area. A method for providing used vehicle parts obtained from used vehicles compromises the steps of conveying a used vehicle along a conveyor line, sequentially removing selected used parts from the vehicle, identifying used vehicle parts, storing used vehicle parts in a storage area and entering and maintaining inventory information on the used vehicle parts in a record-keeping system.

22 Claims, 4 Drawing Figures

USED VEHICLE PARTS DISASSEMBLY SYSTEM AND METHOD

BACKGROUND OF THE INVENTION

1. Field of the Invention

This invention relates to a system and method for disassembling used vehicles to recover usable parts and for inventorying and warehousing the recovered parts.

2. Description of the Prior Art

The used vehicle parts industry, while significant in terms of employment figures and sales volume (Department of Commerce, The Auto Wrecking/Dismantling Industry (1968)), has not been the subject of any significant rationalization scheme. It operates at the level of a "junkyard," a rather disorganized and typically small operation. These conditions have persisted despite the important role of this industry in keeping available parts for older vehicles which are no longer manufactured, in providing a less expensive alternative to the purchase of new replacement parts for newer vehicles and in holding insurance costs down by allowing repair of wrecked vehicles with equivalent old, rather than new, parts. Often an insurance company will specify that only used parts can be employed in a repair job for which it must pay. Such parts can only be obtained by dismentling a discarded vehicle identical or similar to the one to be repaired.

The used vehicle parts industry has a potential role in the growing area of recycling and energy and resource conservation, since it promotes reuse of serviceable used parts and avoids the energy and resource costs of new manufacture. An efficient and rationalized used parts industry could also lead to the disappearance of junkyards where rusting vehicle hulks lie, an idle resource and an unpleasant sight.

The present "junkyard" system for disassembly of used vehicles and recovery of their parts, fails to serve the above-stated goals or serves them inefficiently, at best. The typical junkyard stores complete or partially dismantled hulks of discarded vehicles with no particular organization; reusable parts are not systematically reclaimed and inventoried. Accordingly, the existence and potential usefulness of the parts available in the stored hulks is largely unknown.

SUMMARY OF THE INVENTION

The present invention, showing a system and method for the disassembly of used vehicles and for storage and inventory control of recovered parts represents a major change in approach to the vehicle wrecking and dismantling industry. The proposed system preferably comprises conveyor means on which the used vehicle is transported during disassembly; means for removing used parts from the used vehicle while it is being transported on the conveyor means; a storage area for storing the used parts removed during disassembly; means for identifying the used vehicle parts stored in the storage area; and means for maintaining inventory records of the used vehicle parts which are stored in the storage area. The proposed method preferably comprises the steps of conveying a used vehicle along a conveyer line; sequentially removing selected used parts from the used vehicle; identifying used vehicle parts; storing used vehicle parts in a storage area; and entering and maintaining inventory information on the used vehicle parts into a record-keeping system.

It is an object of the present invention to provide a system and method for an efficient used vehicle parts disassembly operation.

It is an additional object of the present invention to provide a system and method for efficient recovery of used vehicle parts.

It is a further object of the invention to provide a system and method for storage and inventory control of used vehicle parts recovered from a disassembly operation.

BRIEF DESCRIPTION OF THE DRAWINGS

The present invention may be better understood by reference to the specification when taken in conjunction with the accompanying drawings, in which like numerals refer to like features throughout, wherein.

DETAILED DESCRIPTION OF THE INVENTION

Figure 1:
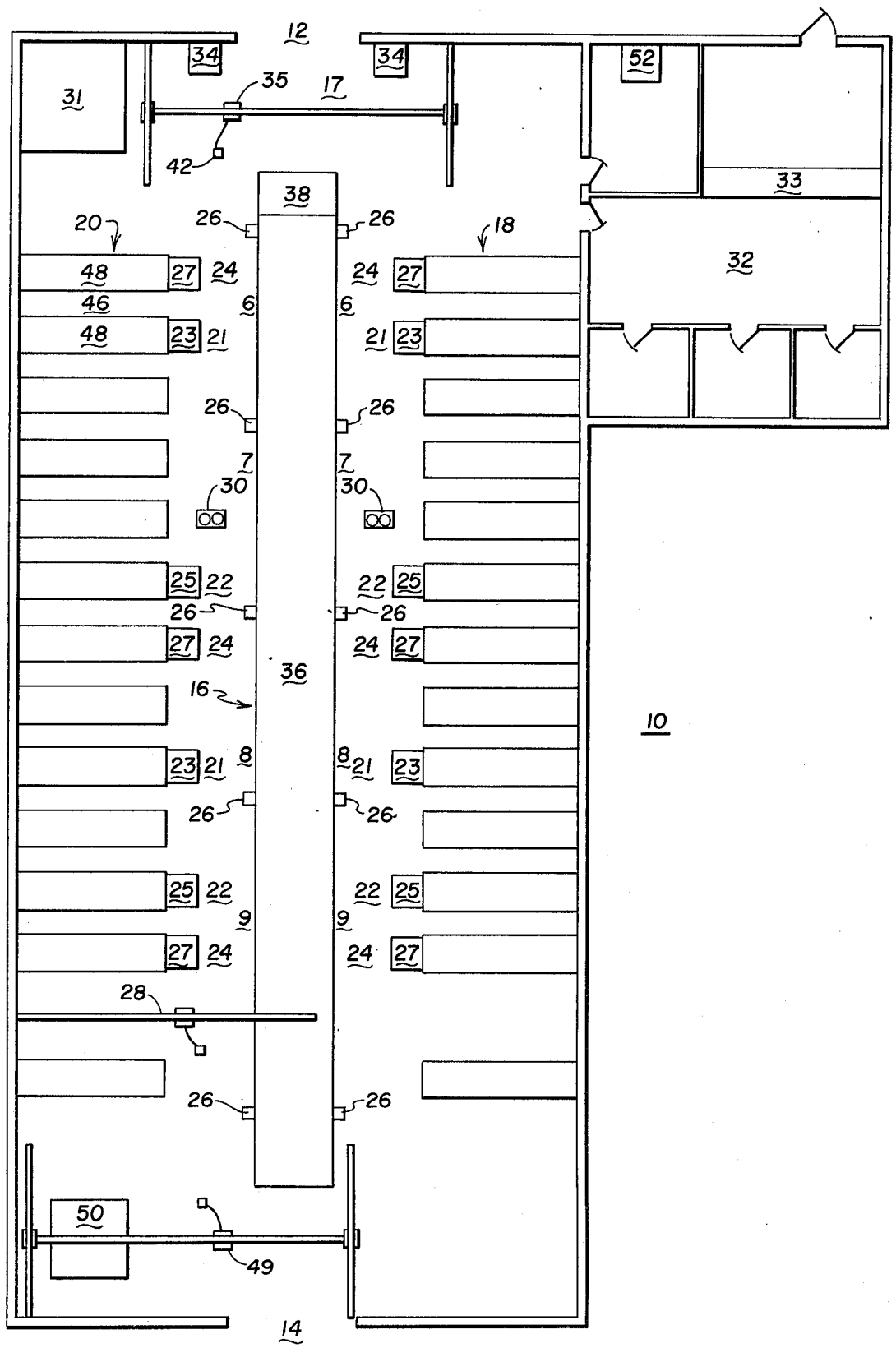
FIG. 1 is a plan view of the used vehicle parts operation.

FIG. 1 shows a main building 10 with a vehicle entrance 12 at one end and a hulk exit 14 at the other, with a disassembly line 16 running substantially the full length of the building between the entrance 12 and exit 14. Immediately inside the vehicle entrance is an engine testing and vehicle preparation area 17. On either side of the disassembly line 16 are located a right side storage area 18 and a left side storage area 20 which also run substantially the full length of the main building 10. At intervals along the disassembly line 16, and adjacent thereto, are parts testing areas 21 and cleaning areas 22 containing equipment for removing any accumulations of dirt, lubricants or other foreign matter from vehicle parts and for testing the usefulness of particular parts. Also at intervals along the line, and adjacent thereto, are labeling stations 24 and disassembly line control boxes 26. Running transverse to the disassembly line 16 at a point close to the hulk exit 14 is an overhead conveyor lift 28 which runs on an overhead track from the left side of the disassembly line 16 into the left side storage area 20. Located on both the right and the left sides of the disassembly line 16 are acetylene cutting torches 30, or arc welding or power saw equipment, suitable for cutting heavy metal and portably mounted so that they can be moved to any point along the disassembly line 16.

In a partitioned-off corner of the main building 10 is a small fire-proofed area 31 in which fuel tanks removed from the disassembled vehicles are stored. In a separate structure attached to the main building, and preferably located on the opposite side of the disassembly line 16 from the fuel tank storage area 31 is an office and sales area 32, including a sales counter 33 and an inventory record storage device 52, where the salvaged parts inventory information is entered, updated and recalled for sales and accounting purposes.

The engine testing and vehicle preparation area 17 preferably contains engine analysis equipment 34 for testing the operation of any engines which can be started. An engine analyzer such as the Marquette 42-165 Engine Analyzer or some comparable device is kept in this area for such testing. This type of an analyzer shows the condition of ignition, carburetion, cranking and charging systems. Additional useful testing devices which may appear in this area are combustion analyzers, generator and starter armature testers, vacuum and fuel pressure testers.

Also preferbly located in the engine testing and vehicle preparation area 17 is an overhead lift 35 of the type well known in the art. The lift should be suitable for lifting heavier vehicle subassemblies such as truck axles, which it may be desirable to remove from vehicles before they enter the disassembly line 16.

Figure 2:
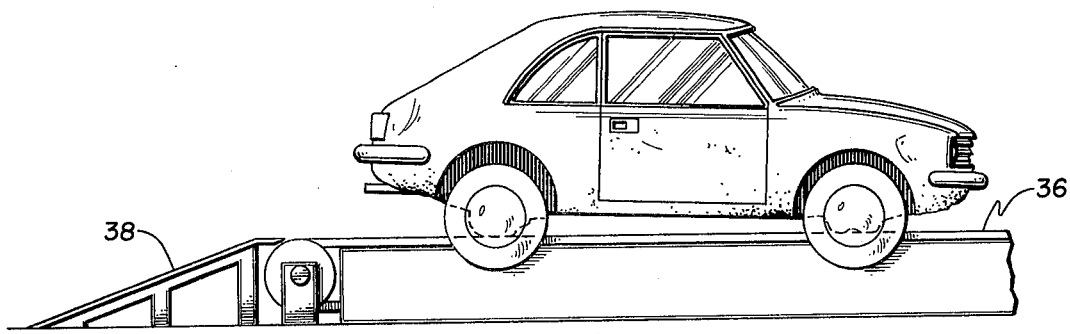
FIG. 2 is a detail of the disassembly line conveyor.

The disassembly line 16 of the present invention is based on the conveyor 36, a portion of which is shown in FIG. 2, which resembles in structure and driving means, those used in conventional vehicle assembly lines and therefore needs no detailed explanation. It is essentially an endless belt which is either raised far enough above the floor of the building so that the wheels of the vehicles conveyed along it do not touch the floor, or constructed in a long well in the floor, deep enough to give wheel clearance. In either case the vehicle should be conveyed at a comfortable working height for a person standing on the floor. The conveyor 36 used in the present system differs from those used on conventional assembly lines only in that its width is such that it can accommodate a wide variety of frame sizes, including those of small foreign cars and those of larger trucks.

Figure 3:
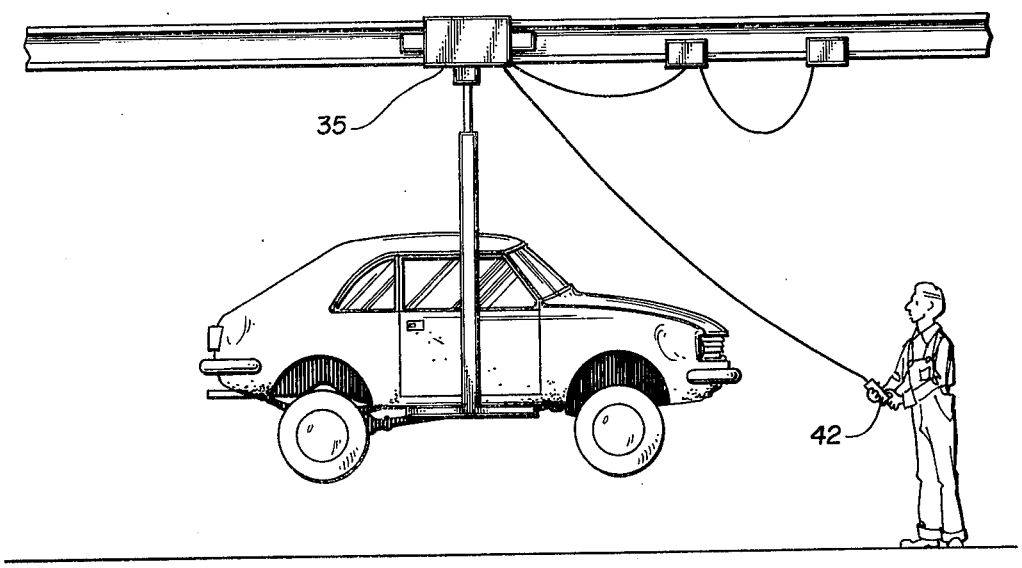
FIG. 3 is a detail of an overhead lifting device.
Figure 4:
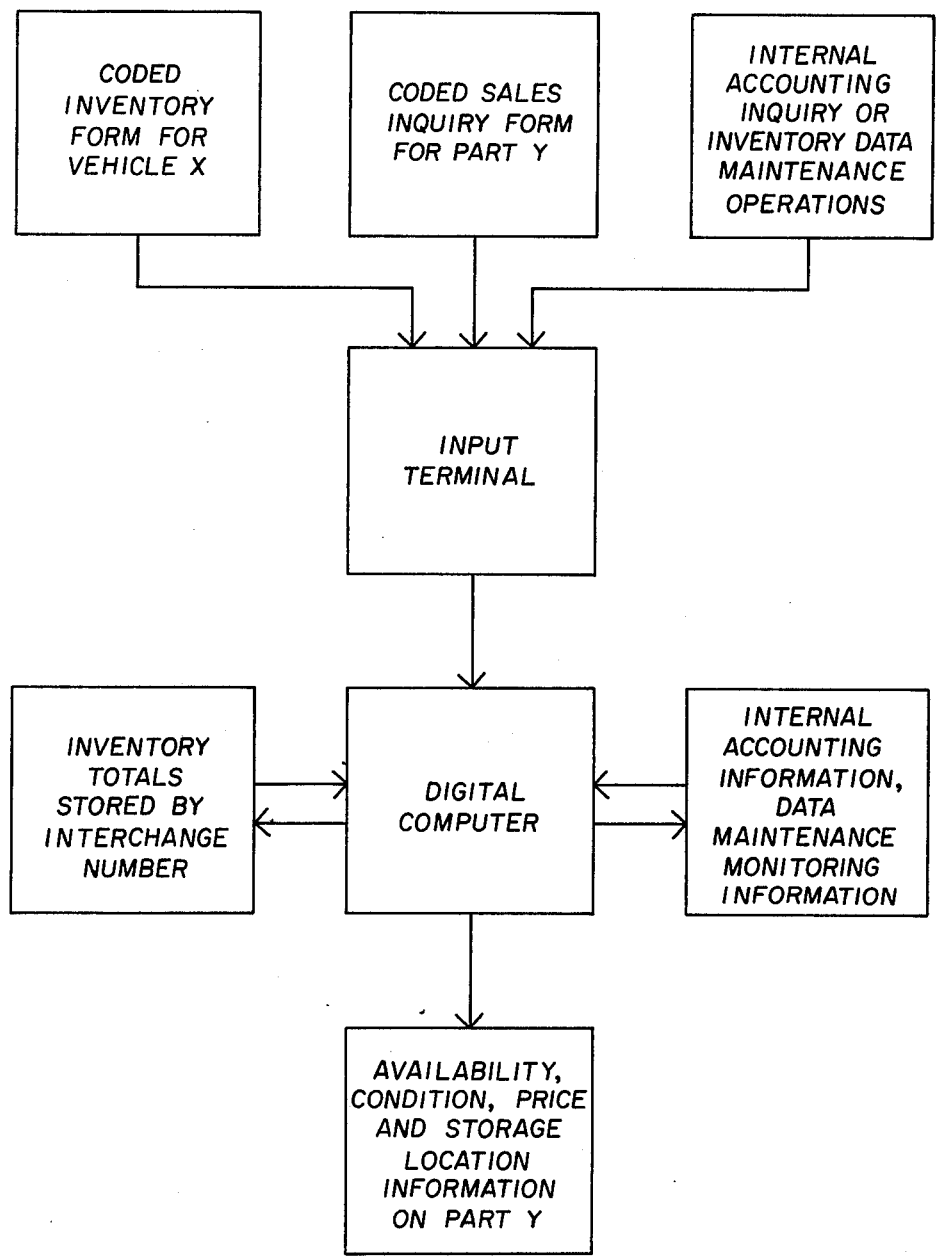
FIG. 4 is a flow chart indicating the information processing functions of the automated vehicle parts inventory system.

A ramp 38 connecting the floor level of the building with the conveyor 36 is used to bring vehicles from the engine testing and preparation area 17 to the disassembly line 16. Vehicles with wheels can be rolled up this ramp 38 with the assistance of the overhead hoist 35 located near the engine testing and preparation area 17 and movable between that area and the starting end of the conveyor 36. Vehicles without wheels can also be loaded onto the conveyor 36 by dragging them up it, or lifting them over the ramp 38, also using the overhead lifting hoist 35 as shown in FIG. 3. Controls 42 for the overhead lifting hoist 35 hang down from overhead, so that the hoist operator can move with the vehicle and observe its progress onto the conveyor 36. Controls 26 for the conveyor 36 itself are located at various points along the disassembly line 16, including at the point near the ramp 38 where the overhead hoist operator would stand.

The right and left side storage areas 18, 20 located on either side of the disassembly line 16 should include a wide variety of storage devices to accommodate the various kinds of parts stored thereon. Bins, shelves and hooks of various sizes are used and may be labeled according to the parts stored therein. In order to save time and effort, the storage areas are designed with two factors in mind. First, the carrying distance between the storage devices and the disassembly line 16 is minimized. This means that the storage devices for parts taken from the right side of the vehicle are preferably located on the right side of the disassembly line 16. Similarly, the storage devices for parts taken from the left side of the vehicle are preferably located on the left side of the disassembly line 16. This means that the storage device for a given part should be located as close as possible to the point on the line where that part is removed from the vehicle. The second factor considered in the location of the storage devices is the weight of the item to be stored, since many items are hand-carried to storage. Storage devices should therefore be arranged so as to place the lighter items in storage devices situated at greater distances from the disassembly point than heavier items disassembled at the same point.

The storage arrangement shown in FIG. 1 is based on the preceding considerations and is the preferred embodiment, but is not considered to be the one optimal solution to the parts storage problem. Therefore, other arrangements of storage can be expected and are intended to be within the scope of this invention. It is also expected that the storage areas could be arranged so as to serve as the display area for a self-service type sale operation.

One particular feature of the storage areas 18, 20 should be noted. The width of the aisles 46 between storage device groups 48 and the height of each storage device are chosen so that any storage device can be serviced with a small fork-lift type conveyor vehicle moving along the aisles 46.

The testing areas 21 located adjacent the disassembly line 16 preferably contain test equipment 23 for testing various parts, such as distributors, distributor points, alternators, alternator diodes, generators, starters, solenoids, radiators, pistons, rings and smaller engine parts which can be tested without running the vehicle engine. Adjacent these testing areas are cleaning areas 22 and labeling stations 24, for cleaning and identifying the parts tested, as well as other parts removed from the vehicle which need not be tested. A variety of cleaning equipment 25 may appear in the cleaning areas 22. Radiators are both cleaned and tested after removal on equipment such as the Model L.V. FCS-868 radiator cleaning and testing bench manufactured by Inland Industrial Products of Omaha, Neb. Solvent baths are also used in cleaning areas 22 for removing dirt or loosening stuck parts in removable and immersible subassemblies. Particularly difficult to clean parts such as pistons, valves, engine heads and brake shoes are cleaned with steam or in abrasive blasting machinery such as the Glass Bead System, also manufactured by Inland Industrial Products, which is available with a wide variety of abrasives, for various types of cleaning.

The labeling stations 24 located at intervals along the disassembly line 16 contain labeling equipment 27, including small tables with storage places for wire and cardboard tags, grease chalk or other materials needed for identifying parts. A metal stamping device may be used for imprinting identification on certain parts. While in the preferred embodiment parts are identified by numbers attached to the parts, it is clear that parts could also be identified by placing them in an appropriately labeled bin or on an appropriately labeled shelf or other storage device in the storage areas 18, 20. Stored parts are preferably identified by inventory numbers from an interchange number system discussed in more detail below. Also located at intervals along the disassembly line 16 are control switches 26 for advancing, stopping or reversing the conveyor 36. The spacing of these controls 26 along the line saves steps, since there is no need to go to a central control point to start or stop the line. The distribution of control switches 26 also adds a safety factor in that the conveyor 36 can be halted by someone at any of several points along its length.

Located at the end of the disassembly line 16 nearest to the vehicle hulk exit 14 is an overhead lift 49 which is used to lift the stripped hulk of the vehicle from the conveyor belt 36 and carry it to a hulk crusher 50, preferably located in the building, or to a truck which will deliver the hulk to a crusher elsewhere.

Available at numerous points such as 6, 7, 8, and 9, along the disassembly line 16 are pneumatic hoses or electric lines (not shown) which power nut- and screwdrivers and other tools used in removing parts from vehicles. For convenience, these hoses or lines hang down from the ceiling so that floor areas remain as unobstructed as possible.

The operation of the described used vehicle parts system and the method of the present invention can best be explained by reference to FIG. 1. The scrap vehicle enters the disassembly line building 10 at the vehicle entrance 12, and is placed in the engine testing and vehicle preparation area 17. The vehicle is identified and the correct inventory form for the make, model and year of vehicle is selected. This form lists all parts to be inventoried and identifies each by an inventory number which is based on the interchangeability of parts between certain vehicle makes, models and years. In the preparation area 17 the engine is tested and a decision is made as to whether to keep the engine intact or to partly or totally disassemble it. If the engine is in good running condition it will not be disassembled. When this testing has been completed, the vehicle fuel tank is pumped dry, capped and removed to the fire-proof area 31. Selected body parts may also be labeled for identification with the appropriate interchange number at this time, so that this need not be done as the vehicle proceeds on the conveyor 36. In addition, if the frame of the vehicle is so constructed that certain parts cannot be removed from the top of the frame, these parts are removed from the underside of the vehicle in the preparation area and delivered by fork-lift or overhead hoist 35 and conveyor 36 to a cleaning or testing area, if necessary, then identified and taken to storage.

When the initial testing and preparatory operations have been completed, the vehicle proceeds to disassembly with its inventory form, listing all salvagable parts and containing spaces for the test information on engine characteristics and an indication of whether the engine is to be dismantled. The vehicle is placed on the conveyor 36 by use of the ramp 38 and overhead lifting device 35. The conveyor 36 is then set in motion so that the vehicle is brought to the first labeling station 24. Here, external parts not already labeled for identification are removed and, after receiving any necessary cleaning and testing, labeled. At this labeling station, inventory information is prepared as the parts are removed by marking the appropriate places on the inventory form which was associated with the vehicle. Since the form already contains identification of the vehicle year, make and model and lists all parts to be inventoried, as the vehicle proceeds only an indication of the existence or nonexistence and the condition of each part, as determined by testing or visual inspection, need be recorded. The form follows the vehicle down the disassembly line 16 until all parts have been removed and noted on the form, at which time it is taken to an inventory record storage device 52, located in the office and sales area 32, for data entry. The inventory records may be stored electronically, on microforms or in a conventional card file. In the preferred embodiment, the inventory form is coded and machine readable, and is read into a computerized record storage system, preferably by a magnetic or optical scanning terminal, although any other suitable input means could be used. In the preferred embodiment of the coded inventory form, all parts are already identified by their interchange inventory numbers, and inventory totals for the parts so identified can be updated immediately. If a form without interchange numbers were used, the computer would have to locate the appropriate interchange inventory numbers in tables before incrementing the inventory totals. In either case, these totals are computed, in order to provide the basis for internal accounting functions as well as responses to customer sales inquiries. Such inquiries may be made via coded forms, also scanned by an input terminal, and would return availability, condition, price and storage location information on each part requested. Internal accounting functions and inventory data maintenance operations, such as price revisions, could also be initiated by computer-scanned coded forms.

If a microform based inventory system is used, the inventory form associated with each vehicle is microphotographed and filed according to make, model and year of vehicle in the inventory record storage device 52. If a conventional card record-keeping system is to be used, the form may be filed directly. In either case, the interchange numbers which identify parts are used in later manual searches of the microfilm, microfiche, or card files to find equivalents of parts requested.

The interchangeability code number system used in the preferred embodiment is found in the Hollander Auto-Truck Interchange, a compendium published, with yearly revisions, by the Hollander Publishing Co., Inc., Minnetonka, Minn. An alternate interchangeability code number system is available from Mitchell Manuals, San Diego, Calif. The interchangeability code numbers, which indicate the equivalence of parts from different makes, models and years, minimize the number of inventory categories which must be maintained and, therefore, simplify storage and record-keeping. Further, they increase the usefulness of a given part by indicating its compatibility with a number of makes, models and years of vehicles.

As the vehicle progresses along the conveyor 36, selected parts are disassembled, while being preserved in recyclable condition; tested and cleaned, if necessary; labeled; recorded for inventory; and placed in storage. The parts are removed in approximately the reverse of the order used for assembly, i.e., substantially as follows: fuel tank (removed before vehicle is placed on disassembly line), hood, front fenders, grill, front bumper, rear bumper, doors, glass, roof, rear fenders or rear quarter, engine, and smaller mechanical parts.

The conveyor 36 moves and stops intermittently according to the speed at which parts can be removed. When a particularly difficult-to-remove part is encountered, it may be left on the hulk or cut out with an acetylene torch 30 or other cutting means to avoid delay in processing the vehicle involved and others on the disassembly line 16. Since the conveyor 36 would preferably accommodate more than one vehicle at the same time, a delay in any one vehicle would cause a delay in the processing of others and must be avoided. Large parts such as the carrier assembly, rear axle, axle shaft, transmission and larger drive shafts are removed from the vehicle at a relatively late stage in the disassembly operation, and are conveyed to storage with the help of overhead hoist 28 or a fork-lift. At the end of the disassembly process, the vehicle hulk is removed from the conveyor 36 by means of another overhead lift 49, which conveys the hulk to an on-site crusher 50 or to a truck for delivery to a crusher elsewhere.

Although one specific embodiment of the present invention has been shown, those skilled in the art will perceive further modifications other than those specifically pointed out above which can be made without departing from the spirit of the invention, and it is intended by the appended claims to cover all such modifications as fall within the true spirit and scope of the invention.

What is claimed as new and desired to be secured by Letters Patent of the United States is:

1. A method for providing used vehicle parts obtained from used vehicles which comprises:
 conveying a used vehicle along a fixed conveyor line;
 sequentially disassembling at various locations along said conveyor line, while preserving in recyclable condition, substantially all recyclable used parts from the used vehicle;
 identifying the sequentially disassembled used vehicle parts;
 storing the sequentially disassembled used vehicle parts in a storage area; and
 entering and maintaining inventory information on the used vehicle parts in a record-keeping system wherein said inventory information is based on inventory numbers which indicate the interchangeability of certain vehicle parts between various makes, models and years, whereby the availability of said used vehicle parts can be determined and a desired used vehicle part and its interchangeable equivalents can be located among the recyclable used vehicle parts stored and identified in the storage area of said integrated system.

2. The method recited in claim 1 wherein the step of identifying used vehicle parts comprises the step of labeling said vehicle parts.

3. The method recited in claim 1 further comprising the step of cleaning selected used vehicle parts.

4. The method recited in claim 1 further comprising the step of testing selected used vehicle parts.

5. The method recited in claim 1 wherein the record-keeping system comprises an electronic digital computer.

6. The method recited in claim 1 wherein the record-keeping system comprises microform records.

7. The method recited in claim 1 wherein the record-keeping system comprises card file records.

8. The method recited in claim 1 further comprising the step of crushing a stripped vehicle hulk.

9. A method for providing used vehicle parts obtained from used vehicles comprising:
 conveying the used vehicle along a conveyor line;
 sequentially removing selected used parts from the used vehicle;
 identifying used vehicle parts with inventory numbers which indicate the interchangeability of said parts between various makes, models and years of vehicles;
 cleaning selected used vehicle parts;
 testing selected used vehicle parts;
 storing used vehicle parts in a storage area; and
 entering and maintaining inventory information on the used vehicle parts in a record-keeping system comprising an electronic digital computer.

10. An integrated system for the disassembly, warehousing and inventory of used vehicle parts obtained from used vehicles comprising:
 fixed conveyor means in said integrated system on which the used vehicle is transported during disassembly;
 means for sequentially disassembling at various locations in said integrated system, while preserving the recyclable condition, substantially all recyclable used parts from the used vehicle while it is being transported on the conveyor means;
 a storage area associated with said integrated system for warehousing the used parts removed during disassembly;
 means for identifying the used vehicle parts warehoused in the storage area; and
 means for maintaining inventory records of the used vehicle parts which are warehoused in said storage area based on inventory numbers which indicate the interchangeability of certain vehicle parts between various vehicle models, makes and years, whereby the availability of said used vehicle parts disassembled in said integrated system from various vehicle models, makes and years can be determined and a desired used vehicle part and its interchangeable equivalents can be located among the recyclable used vehicle parts warehoused and identified in the storage area of said integrated system.

11. The system recited in claim 10 wherein said conveyor means is of the endless belt variety.

12. The system recited in claim 10 wherein said means for identifying the used vehicle parts comprises means for labeling said used vehicle parts.

13. The system recited in claim 10 further comprising means for cleaning used vehicle parts.

14. The system recited in claim 10 further comprising means for testing used vehicle parts.

15. The system recited in claim 10 wherein said means for maintaining inventory records of the used vehicle parts comprises an electronic digital computer.

16. The system recited in claim 10 wherein said means for maintaining inventory records on the used vehicle parts comprises microform records.

17. The system recited in claim 10 wherein said means for maintaining inventory records on the used vehicle parts comprises card file records.

18. The system recited in claim 10 further comprising means for lifting vehicles onto said conveyor means.

19. The system recited in claim 10 further comprising means for moving larger and heavier parts from the conveyor means to the storage area.

20. The system recited in claim 10 further comprising means for removing a stripped vehicle hulk from said conveyor means.

21. The system recited in claim 10 further comprising means for crushing a stripped vehicle hulk.

22. A system for the disassembly, warehousing and inventory of used vehicle parts obtained from used vehicles comprising:
 endless belt conveyor means on which a vehicle is transported during disassembly;
 means for removing used parts from the used vehicle while it is being transported on the conveyor means;
 means for lifting vehicles onto said conveyor means;
 a storage area for storing the used parts removed during disassembly;
 means for removing larger and heavier vehicle parts from the conveyor means to the storage area;
 means for labeling used vehicle parts;
 means for cleaning used vehicle parts;
 means for testing used vehicle parts;
 means for moving a stripped vehicle hulk from said conveyor means; and
 means for maintaining inventory records of the used vehicle parts which are stored in said storage area based on inventory numbers which indicate the interchangeability of certain vehicle parts between various vehicle models, makes and years.

* * * * *